(12) United States Patent
De Rinaldis et al.

(10) Patent No.: US 8,463,517 B2
(45) Date of Patent: Jun. 11, 2013

(54) METHOD FOR HILL START ASSISTANCE FOR MOTOR VEHICLE

(75) Inventors: Alessandro De Rinaldis, Paris (FR); Mickael Mallet, Montigny-le-bretonneux (FR); Richard Pothin, Jouars-Pontchartrain (FR); Yves Le Vourch, Le Chesnay (FR)

(73) Assignee: Renault S.A.S., Boulogne-Billancourt (FR)

( * ) Notice: Subject to any disclaimer, the term of this patent is extended or adjusted under 35 U.S.C. 154(b) by 129 days.

(21) Appl. No.: 12/679,489

(22) PCT Filed: Aug. 18, 2008

(86) PCT No.: PCT/FR2008/051503
§ 371 (c)(1),
(2), (4) Date: Jun. 4, 2010

(87) PCT Pub. No.: WO2009/040487
PCT Pub. Date: Apr. 2, 2009

(65) Prior Publication Data
US 2010/0241328 A1   Sep. 23, 2010

(30) Foreign Application Priority Data
Sep. 25, 2007 (FR) ...................................... 07 57823

(51) Int. Cl.
*F16D 48/08* (2006.01)

(52) U.S. Cl.
USPC .......................................................... 701/67

(58) Field of Classification Search
CPC .............. F16D 2500/50841; F16D 2500/30425
USPC ..................................... 701/67, 68
See application file for complete search history.

(56) References Cited

U.S. PATENT DOCUMENTS

| | | | |
|---|---|---|---|
| 5,509,867 A * | 4/1996 | Genise ........................... | 477/120 |
| 5,550,739 A | 8/1996 | Hoffmann et al. | |
| 5,878,357 A | 3/1999 | Sivashankar et al. | |
| 6,002,974 A | 12/1999 | Schiffmann | |
| 6,035,252 A * | 3/2000 | Dixon et al. ................... | 701/102 |
| 6,416,441 B1 * | 7/2002 | Eckert et al. ................... | 477/185 |
| 6,494,810 B1 * | 12/2002 | Mack et al. ..................... | 477/174 |
| 6,584,391 B2 * | 6/2003 | Lack ................................ | 701/51 |
| 6,594,573 B1 | 7/2003 | Rossmann et al. | |
| 6,816,804 B1 | 11/2004 | Lee | |
| 7,021,410 B2 * | 4/2006 | Hughes ......................... | 180/65.25 |
| 7,074,161 B2 * | 7/2006 | Diebold et al. ................ | 477/184 |
| 7,206,682 B2 * | 4/2007 | Bodin et al. .................... | 701/67 |
| 7,226,389 B2 * | 6/2007 | Steen et al. ..................... | 477/195 |
| 7,494,443 B2 * | 2/2009 | Kamikado ...................... | 477/194 |
| 2004/0153216 A1 | 8/2004 | Tan | |
| 2006/0155440 A1 | 7/2006 | Gleacher | |
| 2010/0094513 A1 * | 4/2010 | Mair ................................ | 701/48 |
| 2010/0138129 A1 * | 6/2010 | Mallet et al. .................... | 701/83 |

FOREIGN PATENT DOCUMENTS

| | | |
|---|---|---|
| DE | 100 08 822 | 9/2001 |
| DE | 10223465 A1 * | 12/2002 |
| DE | 102 42 122 | 3/2004 |
| EP | 1 628 032 | 2/2006 |
| FR | 2 825 434 | 12/2002 |
| FR | 2 834 562 | 7/2003 |
| FR | 2858032 A1 * | 1/2005 |
| GB | 2 324 583 | 10/1998 |
| JP | 2004023943 A * | 1/2004 |
| WO | WO 02/39073 A1 | 5/2002 |

OTHER PUBLICATIONS

EPO Machine Translation of DE 10242122.*
U.S. Appl. No. 12/671,767, filed Feb. 2, 2010, Cayol, et al.

* cited by examiner

*Primary Examiner* — James Trammell
*Assistant Examiner* — David Testardi
(74) *Attorney, Agent, or Firm* — Oblon, Spivak, McClelland, Maier & Neustadt, L.L.P.

(57) ABSTRACT

A method for hill start assistance for a motor vehicle and to an associated device that includes a clutch and a transmission between the clutch and driving wheels of the vehicle. The method determines the torque of the clutch for maintaining the vehicle in an immobile position based on a known engine torque, wherein the torque of the clutch is determined by taking into account a portion of the engine torque dedicated to operation of constituent mechanisms of the vehicle other than the clutch.

6 Claims, 1 Drawing Sheet

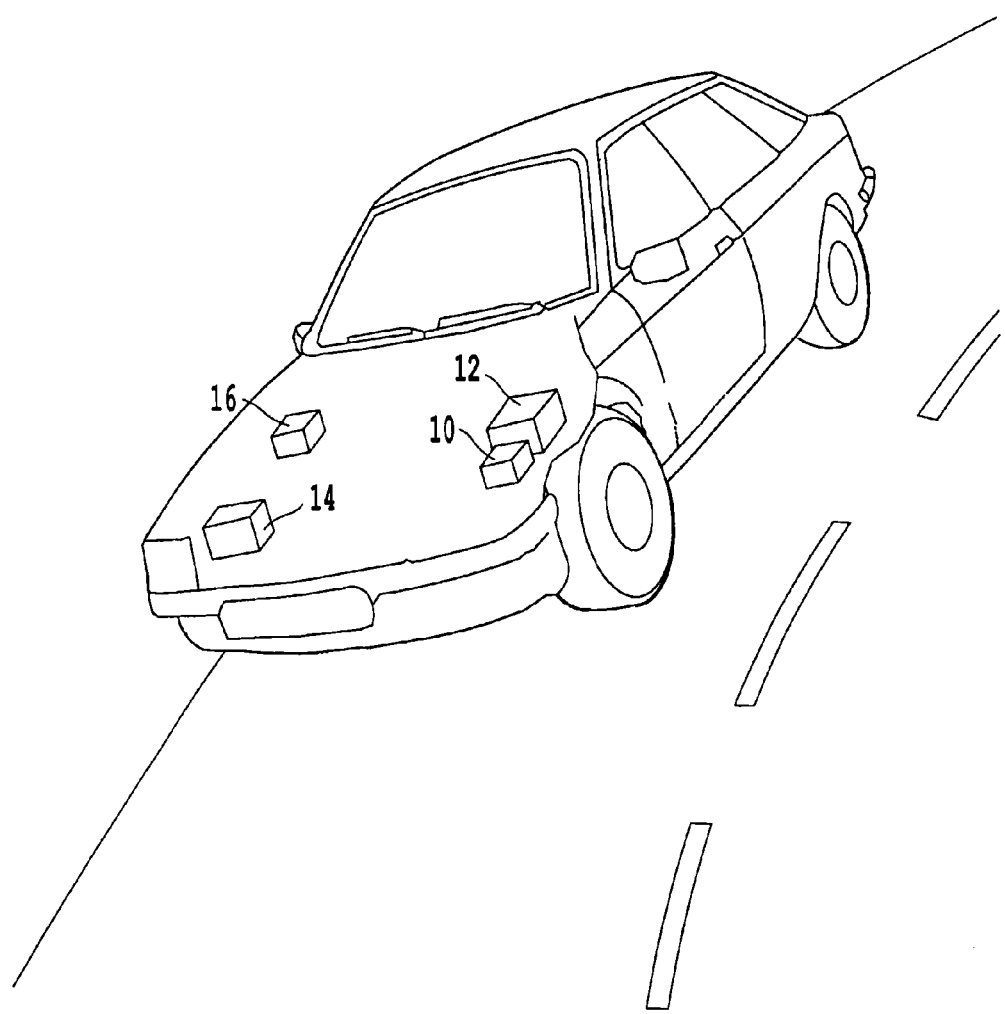

METHOD FOR HILL START ASSISTANCE FOR MOTOR VEHICLE

BACKGROUND

The invention relates to a hill start assistance method for a motor vehicle.

The invention also relates to a hill start assistance device for the motor vehicle, associated with the method.

The invention further relates to a vehicle comprising such a device.

In a hill start, and in the absence of any assistance solution, the driver may be caught out by the backward movement of the vehicle.

Manufacturers have therefore proposed solutions aiming to remedy this drawback.

These solutions are based on various techniques. Of these, some are based on determining the clutch torque to hold the vehicle immobile, based on the knowledge of the engine torque.

It is possible, for example, to cite the document DE 102 421 22 (D1) in which it is proposed to keep the brake of the vehicle active for a predetermined duration in order to facilitate the driver's hill-start maneuver, the brake being released if certain conditions are satisfied, and, among other things, if the clutch torque exceeds a minimum threshold corresponding to the immobility of the vehicle on the gradient.

However, the clutch torque is estimated in such a way in D1 that the torque applied to the drive wheels, via the transmission, may be situated below the threshold needed to ensure a safe hill start, that is to say one that does not in particular generate any backward movement of the vehicle.

BRIEF SUMMARY

One aim of the invention is to overcome these drawbacks.

To achieve this objective, there is proposed a hill start assistance method for a motor vehicle comprising a clutch and a transmission between the clutch and the drive wheels of the vehicle, wherein a clutch torque is determined to keep the vehicle immobile based on the knowledge of the engine torque, characterized in that the clutch torque is determined by taking into account the proportion of the engine torque dedicated to the operation of the constituent means of the vehicle other than the clutch.

To achieve this objective, there is also provided a hill start assistance device for a motor vehicle, comprising a clutch and a transmission between the clutch and the drive wheels of the vehicle, and brakes and computation means managing, based on the knowledge of the engine torque, the pressure applied to the brakes to keep the vehicle immobile, characterized in that the computation means are arranged so that the clutch torque is determined by taking account of the proportion of the engine torque dedicated to the operation of the constituent means of the vehicle other than the clutch.

Other characteristics, aims and advantages of the present invention will become apparent from reading the following detailed description.

BRIEF DESCRIPTION OF THE DRAWING

The single FIGURE reveals a vehicle on a hill.

DETAILED DESCRIPTION

The method takes into account the influence of the proportion of the engine torque dedicated to the operation of means other than the clutch, constituting the vehicle, that act on the value of the clutch torque.

It is based on a balance sum of the moments on the crankshaft of the engine. The torque on the crankshaft can be associated with the wheel torque because the vehicle is stopped.

In a first embodiment, the clutch torque $C_{emb}$ is determined by this sum which provides the relation:

$$C_{emb} = C_{me} - C_{me,off} - J\dot{\omega}_m \quad (1)$$

in which $C_{me}$ is the estimated torque of the engine, $C_{me,off}$ is the estimated quota of the engine torque dedicated to the operation of the accessories of the vehicles, the product $J\dot{\omega}_m$ is the torque equivalent to the means of the engine that exhibit a rotary movement dependent on the engine speed (associated with all the rotating parts).

The engine torque $C_{me}$ is estimated by using a model of the engine in a computer dedicated to this purpose.

The proportion of the engine torque dedicated to the operation of the other constituent means of the vehicle can thus be separated into two types of contributions, represented by the torques $C_{me,off}$ and $J\dot{\omega}_m$.

The torque $C_{me,off}$ is estimated by considering the latter to be the residual value of the engine torque $C_{me}$ when (i) the engine of the vehicle is declutched, (ii) the engine speed is stabilized and (iii) in the absence of any action on the vehicle's accelerator pedal.

In a nonlimiting manner, the accessories involved may be the assisted steering, the compressor forming part of the air-conditioning system for the vehicle's passenger compartment, the engine and passenger compartment fan, and the alternator.

The torque $J\dot{\omega}_m$ comprises two components: the moment of inertia $J$ equivalent to the means of the engine exhibiting a rotary movement dependent on the engine speed, and the derivative of the engine speed $\dot{\omega}_m$.

The moment of inertia $J$ is known, and therefore forms an input datum for determining the clutch torque, without requiring any computation/estimation.

To determine the derivative of the engine speed $\dot{\omega}_m$, the speed of rotation of the engine is determined by means of a dedicated sensor (not represented), then the duly obtained speed is derived by computation means on board the vehicle (onboard microprocessor). Possibly, the computation means perform a filtering step on the duly derived data.

Thus, knowing the various terms on the right of the relation (1), the clutch torque can be deduced therefrom.

For the application concerned, namely the hill-starting of a vehicle, it is essential to be able to benefit from a good estimation of the clutch torque.

In practice, since the vehicle is stopped, the clutch torque corresponds to the torque transmitted to the drive wheels of the vehicle. Thus, knowing the rolling radius of the wheels and the transmission ratio of the moments between the clutch and drive wheels, the force transferred to the ground can be deduced therefrom.

A balance sum of the forces exerted on the vehicle makes it possible to determine the threshold value that makes it possible to ensure an effective hill start (the force transferred to the ground should at least equal the effect of the weight of the vehicle): this threshold value will notably depend on the mass of the vehicle and the gradient of the hill.

Thus, if the clutch torque is badly evaluated, it is in practice possible for the real torque to be below the threshold value. In such a situation the force applied to the drive wheels of the vehicle is then insufficient for an effective hill start.

In a variant embodiment, the clutch torque is not computed directly by the relation (1).

In practice, the clutch torque can be considered to be a disturbance associated with the engine speed. It then becomes necessary to resolve the system formed by the following relations (2) and (3):

$$\dot{\omega}_{m,p} = \frac{1}{J}(-C_{emb} + C_{me} - C_{me,off}) + K_1(\dot{\omega}_{m,p} - \dot{\omega}_m) \quad (2)$$

$$\dot{C}_{emb} = K_2(\dot{\omega}_{m,p} - \dot{\omega}_m) \quad (3)$$

In these relations, the following parameters are introduced: $\dot{\omega}_{m,p}$ which represents the derivative of the engine speed, disturbed; $\dot{C}_{emb}$ the derivative of the clutch torque and $K_1$, $K_2$ constants. The constants $K_1$, $K_2$ are chosen so that the system is stable. The other terms remain unchanged.

The relation (2) corresponds to a modified sum of the moments exerted on the transmission between the clutch and the drive wheels of the vehicle, for which a disturbance $K_1(\dot{\omega}_{m,p} - \dot{\omega}_m)$ associated with the engine speed is added.

The relation (3), for its part, establishes a link between the derivative of the clutch torque and the disturbance associated with the engine speed.

The device used to implement the method comprises, as shown in the FIGURE, a clutch 10, a transmission 12 between the clutch and the drive wheels of the vehicle, brakes 14, and computation means 16.

The computation means are arranged to keep the vehicle immobile based on the knowledge of the engine torque $C_{me}$. The computation means are also arranged so that the clutch torque $C_{emb}$ is determined by taking account of the proportion of the engine torque dedicated to the operation of the constituent means of the vehicle other than the clutch.

Regardless of the method envisaged, it will be understood that the invention is robust to the inaccuracies associated with not taking into account or poorly taking into account, in the prior art, the accessories of the vehicle in computing the torque $C_{me}$.

The invention claimed is:

1. A hill start assistance method for a motor vehicle including a clutch and a transmission between the clutch and drive wheels of the vehicle, the method comprising:
   holding the motor vehicle immobile on a hill;
   determining via computation means of the vehicle a clutch torque ($C_{emb}$) to keep the vehicle immobile based on knowledge of an engine torque ($C_{me}$);
   estimating an equivalent torque $C_{me,off}$ as a quota of the engine torque dedicated to an operation of accessories of the vehicle,
   determining the clutch torque ($C_{emb}$) by a system formed by Equation (2) and Equation (3):

$$\dot{\omega}_{m,p} = \frac{1}{J}(-C_{emb} + C_{me} - C_{me,off}) + K_1(\dot{\omega}_{m,p} - \dot{\omega}_m) \quad \text{Equation (2)}$$

$$\dot{C}_{emb} = K_2(\dot{\omega}_{m,p} - \dot{\omega}_m); \text{ and} \quad \text{Equation (3)}$$

mobilizing the motor vehicle on the hill after a period of immobility, wherein

K1 and K2 are constants;
Equation (2) corresponds to a modified sum of the moments exerted on the transmission between the clutch and the drive wheels of the vehicle, for which a disturbance $K_1(\dot{\omega}_{m,p} - \dot{\omega}_m)$ associated with the engine speed is added, and
Equation (3) establishes a link between the derivative of the clutch torque ($C_{emb}$) and the disturbance associated with the engine speed.

2. The method as claimed in claim 1, wherein the equivalent torque $C_{me,off}$ associated with the accessories of the vehicle is estimated, by considering $C_{me,off}$ to be the residual value of the engine torque $C_{me}$ when:
   the engine is declutched;
   the engine speed is stabilized; and
   in absence of any action on the vehicle's accelerator pedal.

3. The method as claimed in claim 1, further comprising:
   determining the clutch torque ($C_{emb}$) by using Equation (2) and Equation (3) as part of a Kalman observer.

4. The method as claimed in claim 1, wherein the accessories of the vehicle include a mechanism selected from the group consisting of an assisted steering mechanism, an engine compartment fan, a passenger compartment fan, and an alternator.

5. A hill start assistance device for a motor vehicle, comprising:
   a clutch;
   a transmission between the clutch and drive wheels of the vehicle;
   brakes; and
   computation means,
   wherein the computation means are configured to
      determine a pressure applied to the brakes based on knowledge of an engine torque ($C_{me}$) to keep the vehicle immobile,
      estimate an equivalent torque $C_{me,off}$ as a quota of the engine torque dedicated to an operation of accessories of the vehicle, and
      determine the clutch torque ($C_{emb}$) to keep the vehicle immobile by a system formed by Equation (2) and Equation (3):

$$\dot{\omega}_{m,p} = \frac{1}{J}(-C_{emb} + C_{me} - C_{me,off}) + K_1(\dot{\omega}_{m,p} - \dot{\omega}_m) \quad \text{Equation (2)}$$

$$\dot{C}_{emb} = K_2(\dot{\omega}_{m,p} - \dot{\omega}_m), \text{ wherein} \quad \text{Equation (3)}$$

K1 and K2 are constants,
Equation (2) corresponds to a modified sum of the moments exerted on the transmission between the clutch and the drive wheels of the vehicle, for which a disturbance $K_1(\dot{\omega}_{m,p} - \dot{\omega}_m)$ associated with a speed of the engine, is added, and
Equation (3) establishes a link between the derivative of the clutch torque ($C_{emb}$) and the disturbance associated with the speed of the engine.

6. A motor vehicle, comprising a device as claimed in claim 5.

* * * * *